T. MIDGLEY, Jr.
SYSTEM OF CONTROL.
APPLICATION FILED AUG. 20, 1917.

1,435,132.

Patented Nov. 7, 1922.

Patented Nov. 7, 1922.

1,435,132

UNITED STATES PATENT OFFICE.

THOMAS MIDGLEY, JR., OF DAYTON, OHIO, ASSIGNOR, BY MESNE ASSIGNMENTS, TO DELCO-LIGHT COMPANY, OF DAYTON, OHIO, A CORPORATION OF DELAWARE.

SYSTEM OF CONTROL.

Application filed August 20, 1917. Serial No. 187,241.

*To all whom it may concern:*

Be it known that I, THOMAS MIDGLEY, Jr., a citizen of the United States of America, residing at Dayton, county of Montgomery and State of Ohio, have invented certain new and useful Improvements in Systems of Control, of which the following is a full, clear, and exact description.

The present invention relates to an improvement in controlling devices for systems including power driven engines, and more particularly to systems which include power driven engines adapted to drive electric generators for supplying current for charging and other purposes.

One of the objects of the present invention is to provide a system of devices for controlling power driven engines, by limiting the operation of the engine to a determined period of time, by controlling the amount of power medium or fuel which is delivered to the engine.

Further objects and advantages of the present invention will be apparent from the accompanying drawing, wherein a preferred embodiment of one form of the present invention is clearly illustrated.

Figure 1:
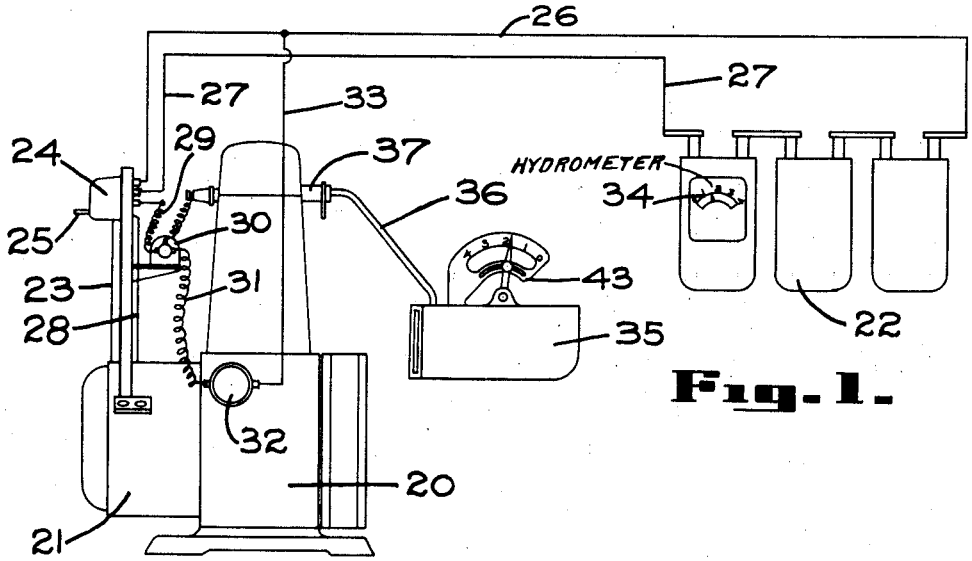
Fig. 1 is a diagrammatic view of an electrical charging system embodying one form of the present invention.

Referring to the drawing, and more particularly to Fig. 1, the numeral 20 designates an engine which may be of any approved type, but which is shown in the present form of the invention as being of the internal combustion type.

This engine is connected to and drives the electric machine 21. This electric machine and the engine 20 are of substantially the same construction as the electric machine and engine described in the patent of C. F. Kettering and W. A. Chryst, No. 1,341,327, dated May 25, 1920, and further description of the details of construction of the above mentioned engine and machine will not be given, except where necessary to a complete understanding of the present invention.

The electric machine 21 is adapted to operate as a generator, being driven by the engine 20 for the purpose of charging a set of storage batteries designated by the numeral 22. Suitable circuit connections connect the batteries 22 with the electric machine 21, the main circuit being as follows:

From the positive side of the electric machine 21, through the conductor 23 to the controller switch 24, said controller switch having a manually operable handle 25 which controls a series of sets of contacts. The construction and operation of this controller 24 is substantially the same as that set forth in the co-pending application of C. F. Kettering and W. A. Chryst, Serial No. 120,098, filed September 14, 1916, and therefore no detail description of this controller is deemed necessary.

This controller switch tends to close the circuit between the conductor 23 and the conductor 26, and to maintain the same closed until such time as the potential of the generator falls below the potential across the terminals of the battery. The conductor 26 is connected to one side of the battery 22, while the opposite side of the battery is connected to conductor 27, which in turn may be connected through a set of contacts controlled by the controller switch handle 25 to the conductor 28.

The ignition system for supplying ignition to the engine 20 is also controlled by means of the controller handle 25, which closes a set of contacts contained within the controller 24 but not shown, to connect the main line circuit above described with the following circuit:

From the conductor 28 and conductor 27 to the conductor 29, thence through the induction coil 30 to conductor 31, through the timing mechanism 32 to the opposite side of the circuit, that is, to the conductor 26, via conductor 33.

Associated with the storage battery 22, there is a hydrometer 34, which is of substantially the same type as that set forth in my co-pending application, Serial No. 183,486, filed July 30, 1917, and the patent of C. F. Kettering, No. 1,337,363, dated April 20, 1920, and therefore only the diagrammatic showing made in Fig. 1 is deemed necessary. This hydrometer is of the submerged type, and by a series of graduations carried by one member of the hydrometer, and a pointer or indicating arm, carried by another part of the hydrometer, the condition of the battery, as to its charge, is automatically indicated.

In the present instance, the graduations of the hydrometer are numbered 0, 1, 2, 3 and 4, and in this particular case, these numerals are indicative of the amount of fuel or power which should be delivered to the engine to run the generator at a determined speed for a determined period of time, so that the battery may be brought to a fully charged condition.

The engine 20, as has been stated heretofore, may be of any suitable type, but in the present form of the invention, there is illustrated an internal combustion engine which is supplied with fuel from a tank 35. This tank may be of any suitable contour, and may contain any predetermined volume or amount of fuel.

Figure 2:
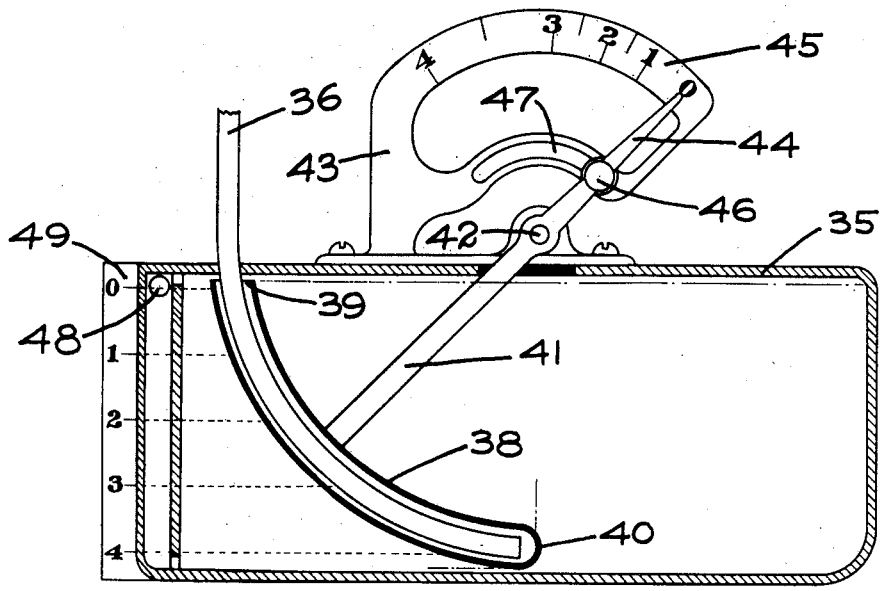
Fig. 2 is a detail view, partly in section and partly in elevation of the fuel controlling devices embodied in the present invention.

The tank 35 is connected to the mixing valve 37 of the engine 20 by means of the fuel delivery pipe 36. One end of the pipe 36 enters the tank 35 and is curved to any suitable degree as is clearly shown in Fig. 2. This curved portion of the pipe 36 which enters the tank 35, telescopically fits within the chamber or receptacle 38, which is open at one end as at 39, and closed at the other end, as at 40.

This receptacle is adjustably mounted within the tank 35, by being secured to the arm or lever 41, which is pivoted at the point 42 to a bracket 43, secured to the top of the tank 35. The opposite end of the arm 41 terminates in the indicating hand or pointer 44, and tends to slide over a dial 45, which carries graduations exactly the same as the graduations carried by the hydrometer 34 heretofore described.

The arm 41 carries a set screw 46, which tends to normally travel in the slot 47, formed in the bracket 43. This set screw may be loosened or tightened as the operator desires, so that the indicating hand 44 of the arm 41 may be set in any given position relative to the graduations on the dial 45, and held there by tightening the set screw 46. At one end of the tank 35 there is provided a gauge 48 to readily indicate the amount of fuel contained within the tank 35, or, more strictly speaking, to indicate the amount by which the fuel in the tank falls short of the determined quantity at which the tank is considered as "filled" with fuel. This amount is ascertained by reading the scale plate 49 which is carried by the gauge 48 and which is graduated in the same units of measurement as the hydrometer 34 and the dial 45. The use of this scale plate will be described hereinafter in connection with the operation of the system.

The operation of the system may be described as follows:

Suppose that the storage batteries 22 are depleted as to charge to such an extent that the hydrometer indicating arm points to the numeral 3 on the scale of the hydrometer. The operator will then set the indicating hand 44 of the fuel control device, so that it will point directly to the numeral 3, providing that the fuel tank is completely filled with fuel.

By adjusting the arm 41 so that its hand 44 will point directly at the numeral 3, the receptacle 38 will be shifted relative to the fuel delivery pipe 36, and also relative to the supply of fuel carried in the tank 35. That is, the upper end of the receptacle 38 will be shifted to the point indicated by dotted line 3 in Fig. 2.

The engine 20 will now be brought into operation in any suitable manner, and fuel will be delivered from the tank 35, by passing through the receptacle 38 to the fuel pipe 36, thence to the mixing valve 37 of the engine, and then in the usual way to the cylinder of the engine. The operation of the engine will continue until such time as the level of the fuel reaches a point below the open end 39 of the receptacle 38, and as soon as the fuel reaches this level, the supply of fuel to the fuel pipe 36, and thus to the engine will be cut off and the engine necessarily brought to a stop.

By determining the output of the generator 21 for operation of the generator for a determined period of time, and then determining the amount of fuel necessary to be supplied to the engine to permit the engine to drive the generator for this length of time, the spacing of the graduations on the dial 45 and on the hydrometer 34 may readily be determined.

As soon as the engine slows down, due to lack of fuel, and the generator stops charging the battery, the controller 24 will operate to break the main charging circuit and the ignition circuit of the engine, and these circuits will be maintained broken until such time as the operator again desires to bring the engine into operation to drive the generator for charging purposes.

With regard to the above description, it should be understood that if the supply of fuel in the tank 35 does not completely fill said tank, it is necessary for the operator to initially take a reading on the scale plate 49 of gauge 48 and then to make proper allowance for the partially filled condition of the tank when setting the arm 41. That is, if instead of having a completely filled fuel tank, the gauge and scale plate indicated that the fuel reached only the level designated by the numeral 1 on the scale plate, and the operator desired to set the hand 44 on the dial 45 correctly, the said hand will be moved to the numeral 4, providing the hydrometer pointer indicates the numeral 3 on the hydrometer 34. It will be readily apparent that the proper setting for the hand 44 is in every case the sum of the hydrometer reading and the reading obtained from the scale 49 of gauge 48. If the sum of these readings exceeds the maximum graduation on the dial 45 then there is not sufficient fuel in the tank to fully charge the batteries. Obviously under these circumstances it will be necessary to place more fuel in the tank 35 and thereby reduce the reading on scale 49 to such a point that when added to the hydrometer reading the sum will not exceed the maximum graduation on the dial 45.

If desired, the fuel controlling device of the present invention may have the dial 45 graduated in hours, minutes or in other suitable increments of time or work, and the engine or the generator 21 may be attached to any apparatus or work devices, and by setting the fuel device to a predetermined requirement, the operation of the engine or the generator may be readily controlled to give the exact result desired. The hydrometer 34 and the scale 49 will of course be graduated in the same units of measurement as the dial 45.

Supposing that the graduations of the dial 45 indicate work hours, and supposing it is desired to operate the engine for four hours to accomplish any desired work, the hand 44 will be set so as to point to the numeral 4, and then sufficient fuel will be delivered to the engine to permit said engine to operate for a period of four hours. At the end of this period of four hours, the engine will of course be automatically stopped because of lack of fuel.

While the form of mechanism herein shown and described constitutes a preferred embodiment of one form of the invention, it is to be understood that other forms might be adopted and various changes and alterations made in the shape, size, and proportion of the elements therein, without departing from the spirit and scope of the invention.

What I claim is as follows:

1. In a fuel supply device, the combination with an internal-combustion engine having an intake; of a fuel tank adapted to contain a quantity of fuel; a pipe leading from a point adjacent the bottom of said tank to said intake whereby fuel is pumped from the tank into the intake; a receptacle located within said tank and adapted to surround a portion of said pipe; and adjustable means for supporting said receptacle in different positions, whereby to limit to different amounts the quantity of fuel delivered from the tank to said pipe.

2. In a fuel supply device, the combination with an internal-combustion engine having an intake; of a fuel tank adapted to contain a quantity of fuel; a pipe leading from said tank to said intake whereby fuel is pumped from the tank into the intake; an open-ended receptacle located within said tank and adapted to surround a portion of said pipe; and means for moving said receptacle whereby its open end may be located at different levels in order to limit the quantity of fuel delivered from the tank to said pipe.

3. A device of the kind described, comprising a tank adapted to contain a determined quantity of liquid and having a scale means whereby the quantity of liquid contained therein may be ascertained, means comprising a movable device for limiting to a predetermined amount the quantity of liquid that may be withdrawn from the tank, a scale means cooperating with the movable device, both of said scale means being graduated in like units of measurement and having their zero graduations corresponding to the liquid level of the said determined quantity of liquid and to the withdrawal of no liquid at the said level, respectively.

4. In a device of the kind described, the combination with a tank adapted to contain a quantity of liquid; a pipe having an end located within said tank; a receptacle adapted to telescope said pipe end; means pivotally supporting said receptacle; and means for securing said supporting means in adjusted position.

5. In a device of the kind described, the combination with a tank adapted to contain a quantity of liquid; a pipe having a curved end located within said tank; a receptacle open at one end telescoping said curved pipe; and means for setting said receptacle relative to said pipe and to the liquid supply to predetermine the amount of liquid to be withdrawn from the tank.

6. In a device of the kind described, the combination with a tank adapted to contain a quantity of liquid; a pipe having an end located within said tank; a receptacle adapted to telescope said pipe end; a lever pivotally mounted upon said tank and supporting the receptacle and having one end thereof extending outside said tank; and means for securing said lever in various positions of adjustment.

7. In a device of the kind described, the combination with a tank adapted to contain a quantity of liquid; a pipe having an end located within said tank; a receptacle adapted to telescope said pipe end; a lever pivotally mounted upon said tank and supporting the receptacle and having one end thereof extending outside said tank and serving as an index; a scale member supported by said tank adjacent said index; and means for securing said lever in various positions of adjustment to said scale member.

8. In a device of the kind described, the combination with a tank adapted to contain a quantity of liquid; a pipe having an end located within said tank; a receptacle adapted to telescope said pipe end; a bracket supported by the tank; a lever for supporting the receptacle, pivotally mounted on said bracket, and provided with an index; a dial carried by said bracket; and means for securing the lever in adjusted position with relation to the dial, whereby the receptacle may be set with relation to the pipe and tank in order to predetermine the amount of liquid to be withdrawn from the tank.

9. A device of the kind described, comprising a tank adapted to contain a quantity of liquid; a conduit extending into the tank for drawing off said liquid; and an open-ended chamber, having its open end up, and translatable with respect to said conduit for predetermining the amount of liquid that may be withdrawn from the tank.

10. A device of the kind described, comprising a tank adapted to contain a quantity of liquid; a conduit extending into the tank for drawing off said liquid; and a chamber completely submerged in the liquid and translatable with respect to said conduit for predetermining the amount of liquid that may be withdrawn from the tank.

11. A device of the kind described, comprising a tank adapted to contain a quantity of liquid; a conduit extending into the tank for drawing off said liquid; and means for predetermining the amount of liquid that may be withdrawn from the tank, said means comprising a chamber surrounding the mouth of said conduit and entirely submerged in the liquid.

12. A device of the kind described, comprising a tank adapted to contain a quantity of liquid; a conduit extending into the tank for drawing off said liquid to a higher level; and means translatable relative to said conduit for predetermining the amount of liquid that may be withdrawn from the tank.

13. A device of the kind described, comprising a tank adapted to contain a quantity of liquid; a conduit extending into the tank for drawing off said liquid to a higher level; and adjustable means cooperating with the mouth of said conduit for predetermining the amount of liquid that may be withdrawn from the tank.

14. A device of the kind described, comprising a tank adapted to contain a quantity of liquid; a conduit communicating with the interior of the tank and having its mouth opening into the tank at a fixed point therein; and a chamber telescoping said conduit and spaced therefrom for predetermining the amount of liquid that may be withdrawn from the tank.

15. A device of the kind described, comprising a tank adapted to contain a quantity of liquid; a conduit communicating with the interior of the tank and having its mouth opening into the tank at a fixed point therein; and a chamber surrounding the mouth of said conduit and translatable with respect thereto for predetermining the amount of liquid that may be withdrawn from the tank.

16. A device of the kind described, comprising a tank adapted to contain a quantity of liquid; a conduit communicating with the interior of the tank and having its mouth opening into the tank at a fixed point therein; and a chamber surrounding the mouth of said conduit for predetermining the amount of liquid that may be withdrawn from the tank.

17. A device of the kind described, comprising a tank adapted to contain a quantity of liquid; a conduit communicating with the interior of the tank and having its mouth opening into the tank at a fixed point therein; and adjustable means surrounding the mouth of said conduit and spaced therefrom for predetermining the amount of liquid that may be withdrawn from the tank.

18. A device of the kind described, comprising a tank adapted to contain a quantity of liquid; a conduit communicating with the interior of the tank and having its mouth opening into the tank at a fixed point therein; and translatable means surrounding the mouth of said conduit for predetermining the amount of liquid that may be withdrawn from the tank.

19. A device of the kind described, comprising a tank adapted to contain a quantity of liquid; a conduit communicating with the interior of the tank and having its mouth opening into the tank at a fixed point therein; and adjustable means surrounding the mouth of said conduit for predetermining the amount of liquid that may be withdrawn from the tank.

In testimony whereof I affix my signature.

THOMAS MIDGLEY, Jr.

Witnesses:
J. W. McDonald,
Walter W. Riedel.